(12) United States Patent
Shimojoh

(10) Patent No.: US 7,011,441 B2
(45) Date of Patent: Mar. 14, 2006

(54) BACKLIGHT UNIT AND LIQUID CRYSTAL DISPLAY APPARATUS

(75) Inventor: Kazuya Shimojoh, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 174 days.

(21) Appl. No.: 10/668,205

(22) Filed: Sep. 24, 2003

(65) Prior Publication Data

US 2005/0099556 A1    May 12, 2005

(30) Foreign Application Priority Data

Sep. 25, 2002   (JP)   .............................. 2002-279077
Aug. 8, 2003    (JP)   .............................. 2003-290960

(51) Int. Cl.
 *F21V 8/00*   (2006.01)
(52) U.S. Cl. ...................................... 362/624; 362/633
(58) Field of Classification Search .................. 362/26, 362/31, 330, 339, 561, 606, 608, 609, 615, 362/619, 620, 621, 624, 627, 633; 349/58, 349/62, 64, 65
See application file for complete search history.

(56) References Cited

U.S. PATENT DOCUMENTS

| | | | | |
|---|---|---|---|---|
| 5,774,199 A | * | 6/1998 | Ozawa | 349/67 |
| 6,219,116 B1 | * | 4/2001 | Yuuki et al. | 349/58 |
| 6,305,812 B1 | * | 10/2001 | Kim et al. | 362/31 |
| 6,402,334 B1 | * | 6/2002 | Yu-San | 362/31 |
| 6,426,763 B1 | * | 7/2002 | Sagawa | 346/65 |

FOREIGN PATENT DOCUMENTS

| | | |
|---|---|---|
| JP | 09-282919 A | 10/1997 |
| JP | 2001-75490 A | 3/2001 |
| JP | 2002-109931 A | 4/2002 |

* cited by examiner

*Primary Examiner*—Y. My Quach-Lee
(74) *Attorney, Agent, or Firm*—Birch, Stewart, Kolasch & Birch, LLP

(57) ABSTRACT

A backlight unit is provided, which comprising a light source for generating light, and an element comprising an incident portion, through which light generated by the light source enters into the element, and an emitting portion through which the entering light is emitted after traveling through the element. A rib is provided on at least a portion of a periphery of the element to reinforce the element, and a panel receiving portion is provided at a portion of the element surrounded by the rib.

11 Claims, 11 Drawing Sheets

BACKLIGHT UNIT AND LIQUID CRYSTAL DISPLAY APPARATUS

This nonprovisional application claims priority under 35 U.S.C. § 119(a) on Patent Application Nos. 2002-279077 and 2003-290960 filed in Japan on Sep. 25, 2002 and Aug. 8, 2003, which are herein incorporated by reference.

BACKGROUND OF THE INVENTION

1. Field of the Invention

The present invention relates to a backlight unit and a liquid crystal display apparatus. More particularly, the present invention relates to a backlight unit for illuminating a liquid crystal or the like from the rear side thereof, and a liquid crystal display apparatus comprising the backlight unit

2. Description of the Related Art

In general, a liquid crystal display apparatus comprises a liquid crystal panel comprising a pair of opposed substrates, between which a liquid crystal layer is sandwiched. An electrode is provided on each of the pair of opposed substrates. By applying a display voltage to the liquid crystal layer via the electrodes to change the orientations of liquid crystal molecules within the liquid crystal layer, light incident on the liquid crystal layer is transmitted/blocked so as to display characters, graphics or the like on the display screen.

A backlight unit is provided at the rear side of the liquid crystal panel. The backlight unit comprises a light source and a light guide plate. Light is input from the light source to an end side of the light guide plate. The input light is propagated through the light guide plate and is output through a broader side (proximal to the liquid crystal panel) of the light guide plate. The backlight unit allows light output by the light guide plate to impinge on the liquid crystal panel. There is a particular demand for a larger-sized, thinner, and brighter liquid crystal display apparatus.

Hereinafter, the configuration of a liquid crystal display apparatus comprising a conventional backlight unit will be described.

FIG. 10 is an exploded perspective view of a conventional liquid crystal display apparatus 300, showing the configuration of the major parts thereof.

Referring to FIG. 10, the liquid crystal display apparatus 300 comprises a liquid crystal panel 101 and a backlight unit 110 provided at the rear side of the liquid crystal panel 101.

The backlight unit 110 comprises a frame 111 for housing other members. The frame 111 houses a reflection sheet 112, a light guide plate 113, and optical sheets 114 and 115 in this order from the bottom.

The reflection sheet 112 is provided so to reflect light emitted from the rear side of the light guide plate 113 and causes the light to propagate toward the front of the light guide plate 113. The optical sheets 114 and 115 are provided so as to make uniform the light which is emitted from the front side of the light guide plate 113 and illuminates the liquid crystal panel 101.

A light source (lamp) 116 comprising an LED, a fluorescent tube, or the like, is provided along an end of the light guide plate 113. The light source (lamp) 116 is inserted into the frame 111 from the rear side thereof. A lamp cover 117 is attached to the frame 111 so as to surround the lamp 116. The lamp cover 117 is provided so as to protect the lamp 116 from damage and reflect light from the lamp 116 toward the light guide plate 113. A reflective thin film is provided on a surface of the lamp cover 117 by attaching, coating, depositing, or the like.

Circuit boards 102 and 103 each comprising a peripheral drive circuit are attached and connected to the liquid crystal panel 101. The liquid crystal panel 101 is mounted on the backlight unit 110. The circuit boards 102 and 103 are folded onto the rear side of the backlight unit 110. Board covers 104 and 105 are provided so as to insulate and protect the circuit boards 102 and 103. In addition, a front bezel 120 is attached to the front side of the liquid crystal panel 101.

The liquid crystal display apparatus 300 is assembled as follows.

The reflection sheet 112, the light guide plate 113, and the optical sheets 114 and 115 are stacked and housed in the frame 111 in this order from the bottom.

Next, the light source (lamp) 116 comprising an LED, a fluorescent tube, or the like is inserted into the frame 111 from the rear thereof. Thereafter, the lamp cover 117 is attached to the frame 111. Thus, the assembly of the backlight unit 110 is completed.

Next, the liquid crystal panel 101 is mounted on the backlight unit 110. The circuit boards 102 and 103 are folded onto the rear side of the backlight unit 110. The board covers 104 and 105 are attached to the backlight unit 110, respectively. The front bezel 120 is attached from above to the liquid crystal panel 101 so far obtained. Thus, the assembly of the liquid crystal display apparatus 300 is completed.

FIG. 11 is an exploded perspective view of another conventional liquid crystal display apparatus 400, showing the configuration of the major parts thereof.

Referring to FIG. 11, in the liquid crystal display apparatus 400, a reflection sheet 112, a light guide plate 113, and optical sheets 114 and 115, are stacked and housed in a frame 111 of a backlight unit 110 in this order from the bottom, as in the liquid crystal display apparatus 300 of FIG. 10.

A light source (lamp) 116 comprising an LED, a fluorescent tube, or the like is provided along an end of the light guide plate 113. The light source 116 is inserted into the frame 111 from the rear side thereof. A reflector 118 is previously attached to a portion of the frame 111 which partially surrounds the lamp 116. The reflector 118 reflects light from the lamp 116 toward an end of the light guide plate 113.

Circuit boards 102 and 103 each comprising a peripheral drive circuit are provided around the liquid crystal panel 101, as in the liquid crystal display apparatus 300 of FIG. 10. The liquid crystal panel 101 is mounted on the backlight unit 110. The circuit boards 102 and 103 are folded onto the rear side of the backlight unit 110. A back bezel 121 is attached to the rear side of the liquid crystal panel 101 so as to enhance the strength of the backlight unit 110, insulate and protect the circuit boards 102 and 103, and prevent the breakage of the lamp 116. In addition, a front bezel 120 is attached to the front side of the liquid crystal panel 101.

The liquid crystal display apparatus 400 is assembled as follows.

The reflection sheet 112, the light guide plate 113, and the optical sheets 114 and 115 are stacked and housed into the frame 111 in this order from the bottom.

Next, the light source (lamp) 116 comprising an LED, a fluorescent tube, or the like is inserted into the frame 111, to which the reflector 118 is attached, from the rear side thereof. Thus, the assembly of the backlight unit 110 is completed.

Next, the liquid crystal panel 101 is mounted onto the backlight unit 110. The circuit boards 102 and 103 are folded onto the rear side of the backlight unit 110. The back bezel 121 is attached to the rear side of the backlight unit 110. The front bezel 120 is attached from above to the liquid crystal panel 101 so far obtained. Thus, the assembly of the liquid crystal display apparatus 400 is completed.

In recent years, there is a demand for a lower-cost, lower-weight, and thinner liquid crystal display apparatus. With the advance of manufacturing technology, separate parts for different purposes, such as the board covers 104 and 105, the lamp cover 117, and the like, are attached to the rear side of the backlight unit 110 as in the liquid crystal display apparatus 300 of FIG. 10 rather than the liquid crystal display apparatus 400 of FIG. 11.

FIG. 12 is a perspective view of a conventional light guide plate 113, showing the structure of the major parts thereof.

Referring to FIG. 12, the conventional light guide plate 113 comprises ears 119 for positioning and prevention of displacement when the light guide plate 113 is housed in the frame 111. However, no device is provided so as to enhance the strength of the light guide plate 113.

Japanese Laid-Open Publication No. 9-282919 discloses a technique for solving the poor strength of the light guide plate.

Conventionally, the light guide plate is separated from the frame since if the light guide plate and the frame are joined together, luminance irregularity occurs at the joint. In the conventional case, however, the strength of the backlight unit is poor. Japanese Laid-Open Publication No. 9-282919 discloses a technique to solve this problem as follows. Plate-like flange portions are provided, which protrude from either the front side or the rear side of a light guide plate and have a thickness of substantially the half of the thickness of the light guide plate. Flange receiving portions corresponding to the flange portions are formed on a side of the frame which faces the flange portions with a gap therebetween. The flange portions and the flange receiving portions are welded together with spot-like welding portions. Therefore, the light guide plate and the frame are integrated together while keeping the gap therebetween, so that the strength of the backlight unit is improved.

Japanese Laid-Open Publication No. 2001-75490 discloses a liquid crystal panel holder which is provided between a liquid crystal panel and a lamp in order to reduce the number of parts, and a liquid crystal display apparatus comprising the liquid crystal panel holder. The liquid crystal panel holder has a diffusion plate for diffusing light from the lamp and a lamp holder for the lamp. The diffusion plate and the lamp holder are integrally molded of a resin.

Japanese Laid-Open Publication No. 2002-109931 discloses a backlight unit comprising a light guide plate in which light received from the incident side is reflected on the reflection side and is emitted through the light emitting side. In order to reduce the thickness of the backlight unit, a metal reflection film is deposited on the reflection side of the light guide plate and minute pits and projections are provided on the light emitting side opposed to the reflection side so as to diffuse light.

The conventional backlight unit 110 raises the following three problems.

(1) The strength of the backlight unit 110 is insufficient and the warping and flexing of the backlight unit 110 are not sufficiently prevented.

The strength of the backlight unit 110 is mainly improved by combining the frame 111 with the light guide plate 113 to enhance the rigidity of the backlight unit 110, so that the warping/flexing of the backlight unit 110 is minimized.

Further, the back bezel 121 is provided in addition to the frame 111 and the light guide plate 113 so as to improve the rigidity of the backlight unit 110, so that the warping/flexing of the backlight unit 110 is minimized.

Japanese Laid-Open Publication No. 9-282919 discloses that the strength of a backlight unit is improved by welding the flange portions of a light guide plate with the flange receiving portions of a frame with spot-like welding portions into an integral form.

(2) It is not easy to assemble the backlight unit 110.

The backlight unit 110 is generally assembled as follows. The reflection sheet 112, the light guide plate 113, and the optical sheets 114 and 115 are housed in the frame 111 in this order. Next, the light source (lamp) 116 is inserted into the frame 111. The lamp cover 117 is optionally attached to the frame 111.

Recently, frames 111 for housing other members are becoming smaller and thinner. Therefore, the frame 111 itself is less rigid, and warps and flexes under its own weight. Therefore, it is difficult to house members in the frame 111. It is necessary to delicately handle the assembly of the backlight unit in order to avoid the displacement of members from the frame 111, assembly errors, and the like. As a result, the assembly time is elongated, leading to an increase in the manufacturing cost of the backlight unit.

In recent years, there is a demand for a lower-cost liquid crystal display apparatus. A large cost cutting is also required for the backlight unit 110. Therefore, a reduction in the number of members, the integration of members, the elimination of a member, simplification of assembly, and the like have been tried to reduce cost.

For example, Japanese Laid-Open Publication No. 2001-75490 discloses that the number of members is reduced by integrating a diffusion plate with a lamp holder so that the assembly is made easier. However, in this publication, a backlight is provided right under a liquid crystal panel without a light guide plate. Such a backlight system (direct backlight system) is fundamentally different from a backlight unit comprising a light guide plate in terms of structure.

(3) It is not easy to produce a smaller-sized and thinner backlight unit 110 having a narrower-picture-frame.

Conventionally, the size of the backlight unit 110, the size of the picture-frame for the screen of a liquid crystal display apparatus, and the thickness of a liquid crystal display apparatus, are determined by the frame 111 for housing the light guide plate 113. Therefore, no liquid crystal display apparatus having a picture-frame size smaller than the size of the frame 111 and a thickness smaller than that of the frame 111 has been achieved.

Japanese Laid-Open Publication No. 2002-109931 discloses that a metal reflection film is deposited on the reflection side of a light guide plate and minute pits and projections are provided on the light emitting side of the light guide plate so that the thickness of the backlight unit is smaller than when the same functions are otherwise achieved by using other members.

SUMMARY OF THE INVENTION

According to a backlight unit is provided, which comprising: a light source for generating light; and an element comprising an incident portion, through which light generated by the light source enters into the element, and an emitting portion through which the entering light is emitted after traveling through the element. A rib is provided on at least a portion of a periphery of the element to reinforce the element, and a panel receiving portion is provided at a portion of the element surrounded by the rib.

In one embodiment of this invention, the element is a light guide plate comprising a side through which light generated by the light source enters into the element and a first broad side through which the light is emitted after traveling through the element.

In one embodiment of this invention, the light guide plate is provided with a groove along at least a edge thereof and the light source is provided in the groove. Light generated by the light source enters through a first side of the groove into the light guide plate.

In one embodiment of this invention, a dot pattern of minute pits and projections is provided on the first broad side of the light guide plate. The light guide plate further comprises a second broad side opposed to the first broad side, a plurality of grooves being arranged in parallel on the second broad side.

In one embodiment of this invention, a light reflective thin film is provided on a second side of the groove and not on the first side thereof.

In one embodiment of this invention, a side of the element on which the emitting portion is provided is in the shape of a rectangle having four corner portions. The rib is provided in the vicinity of any of the four corner portions.

In one embodiment of this invention, at least an additional rib is provided on at least a portion of the periphery of the element. A plurality of ribs including the rib and the additional rib are provided in the vicinity of two adjacent corner portions of the four corner portions, in the vicinity of two opposing corner portions of the four corner portions, or in the vicinity of the four corner portions.

In one embodiment of this invention, the rib is provided on any of the four corner portions as well as in the vicinity thereof.

In one embodiment of this invention, the element is a frame having a buried portion in which a light-transmissive material is buried. The buried portion comprises a side through which light generated by the light source enters into the element and a first broad side through which the entering light is emitted after traveling through the element.

In one embodiment of this invention, the buried portion is provided with a groove along at least an edge thereof and the light source is provided in the groove. Light generated by the light source enters through a first side of the groove into the buried portion.

In one embodiment of this invention, a dot pattern of minute pits and projections is provided on the first broad side of the buried portion. The buried portion further comprises a second broad side opposed to the first broad side, a plurality of grooves being arranged in parallel on the second broad side.

In one embodiment of this invention, a light reflective thin film is provided on a second side of the groove and not on the first side thereof.

According to another aspect of the present invention, a liquid crystal display apparatus is provided, which comprises: a liquid crystal panel; and a backlight unit for illuminating the liquid crystal panel. The backlight unit comprises: a light source for generating light; an element comprising an incident portion, through which light generated by the light source enters into the element, and an emitting portion through which the light is emitted after traveling through the element. A rib is provided on at least a portion of a periphery of the element to reinforce the element, and a panel receiving portion is provided at a portion of the element surrounded by the rib.

Functions of the present invention will be described below.

In the present invention, a single element functions as both a light guide plate and a frame. Thereby, the number of parts of the backlight can be reduced. Therefore, it is possible to provide a thinner and lower-weight liquid crystal display apparatus a having narrower-picture-frame.

In the present invention, a rib is provided on at least a portion of the periphery of a light guide plate (e.g., at least in the vicinity of a corner portion of the periphery) to reinforce the light guide plate, and a panel receiving portion is provided at a portion of the light guide plate surrounded by the rib. Thereby, the light guide plate can have a function of housing other members, i.e., can function as a frame. Therefore, the light guide plate has a sufficient level of strength and therefore a conventional frame is unnecessary, leading to an improvement in ease of assembly. Whereas the cost of the light guide plate increases, the number of members is reduced and it is easier to assemble a backlight unit. Therefore, the total manufacturing cost can be reduced.

A groove for incorporating a lamp is provided along an end portion of the light guide plate, and a side of the groove serves as an incident portion. A side of the groove except for the incident portion is provided with a thin film having a reflectivity similar to that of a reflector by coating, attaching, depositing, or the like. Therefore, a lamp cover can be eliminated, thereby making it possible to reduce the manufacturing cost.

A dot pattern of minute pits and projections is provided on the first broad side of the light guide plate by printing, graining, or the like. A plurality of grooves perpendicular to a light traveling direction (light emitting direction) are provided on the second broad side opposed to the first broad side of the light guide plate. Thereby, light entering from the incident portion (a side of the light guide plate) is allowed to travel toward the emitting portion (the first broad side of the light guide plate) and the liquid crystal panel can be uniformly illuminated. It is possible to eliminate optical sheets and reduce the manufacturing cost.

In the present invention, a frame is made of a material having a high level of light transmittance (light-transmissive material), such as one which is used for a light guide plate. The frame comprises a buried portion in which a light-transmissive material is buried, so that the frame can function as a light guide plate. Thereby, the frame can have a sufficient level of strength and a light guide plate is eliminated, leading to an improvement in ease of assembly. Whereas the cost of the frame increases, the number of members is reduced and it is easier to assemble a backlight unit. Therefore, the total manufacturing cost can be reduced.

A groove for incorporating a lamp is provided along an end portion of the frame, and a side of the groove serves as an incident portion. A side of the groove except for the incident portion is provided with a thin film having a reflectivity similar to that of a reflector by coating, attaching, depositing, or the like. Therefore, a lamp cover can be eliminated, thereby making it possible to reduce the manufacturing cost.

A dot pattern of minute pits and projections is provided on the first broad side of the buried portion by printing, graining, or the like. A plurality of grooves perpendicular to a light traveling direction (light emitting direction) are provided on the second broad side opposed to the first broad side of the buried portion. Thereby, light entering from the incident portion (a side of the buried portion) is allowed to travel toward the emitting portion (the first broad side of the buried portion) and the liquid crystal panel can be uniformly illuminated. It is possible to eliminate optical sheets and reduce the manufacturing cost.

Thus, by providing the element capable of functioning as both a frame and a light guide plate, the number of parts of a backlight unit is reduced, thereby making it possible to provide a thinner and lower-weight liquid crystal display apparatus having a narrower-picture-frame.

As described above, the present invention can provide an element capable of functioning as both a frame and a light guide plate.

According to the present invention, a panel receiving portion and a reinforcement rib are provided on a light guide plate, thereby imparting a strength higher than that of conventional light guide plates to the light guide plate. Therefore, the light guide plate can also serve as a frame. By integrating the function of a frame into a light guide plate, warping and flexing can be reduced as compared to conventional light guide plates. In addition, the number of parts can be reduced. Thus, it is possible to improve the ease of assembly and reduce the manufacturing cost.

The light guide plate integrated with the function of a frame can be smaller and thinner than conventional frames. Therefore, it is possible to obtain a thinner liquid crystal display apparatus having a narrower-picture-frame.

According to the present invention, a groove for incorporating a light source is previously provided to a light guide plate, and a reflective thin film is provided on an inner side of the groove except for an incident portion (a side of the light guide plate). Therefore, it is possible to eliminate a lamp cover having a reflectivity which is conventionally required.

According to the present invention, a dot pattern of minute pits and projections is provided on the first broad side of the light guide plate. A plurality of grooves perpendicular to a light traveling direction (light emitting direction) are provided on the second broad side opposed to the first broad side of the light guide plate. Therefore, it is possible to eliminate optical sheets which are conventionally required.

According to the present invention, a frame is made of a light-transmissive material having a high level of transmittance, such as one which is used for a light guide plate. A buried portion in which such a light-transmissive material is buried is provided in the frame. Thereby, it is possible to impart a strength higher than that of conventional frames to the above-described frame. The frame can also function as a light guide plate. Thus, by imparting the function of a light guide plate to the frame, warping and flexing can be reduced as compared to conventional light guide plates. In addition, the number of parts can be reduced. Thus, it is possible to improve the ease of assembly and reduce the manufacturing cost. The frame having the function of a light guide plate can be smaller and thinner than conventional frames. Therefore, it is possible to provide a thinner liquid crystal display apparatus having a narrower-picture-frame.

According to the present invention, a groove for incorporating a light source is previously provided to the frame, and a reflective thin film is provided on an inner side of the groove except for an incident portion (a side of the frame). Therefore, it is possible to eliminate a lamp cover having a reflectivity which is conventionally required. According to the present invention, a dot pattern of minute pits and projections is provided on the first broad side of the buried portion. A plurality of grooves perpendicular to a light traveling direction are provided on the second broad side opposed to the first broad side of the buried portion. Therefore, it is possible to eliminate optical sheets which are conventionally required.

Thus, according to the present invention, it is possible to provide a smaller and thinner backlight unit and liquid crystal display apparatus having a narrower-picture-frame without impairing the function thereof and with ease of assembly and excellent capability of mass production.

Thus, the invention described herein makes possible the advantage of providing a smaller-sized and thinner backlight unit having a narrower-picture-frame which is easy to assemble and is excellent for mass production without impairing the function thereof, and a liquid crystal display apparatus comprising the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Embodiment 1

Figure 1:
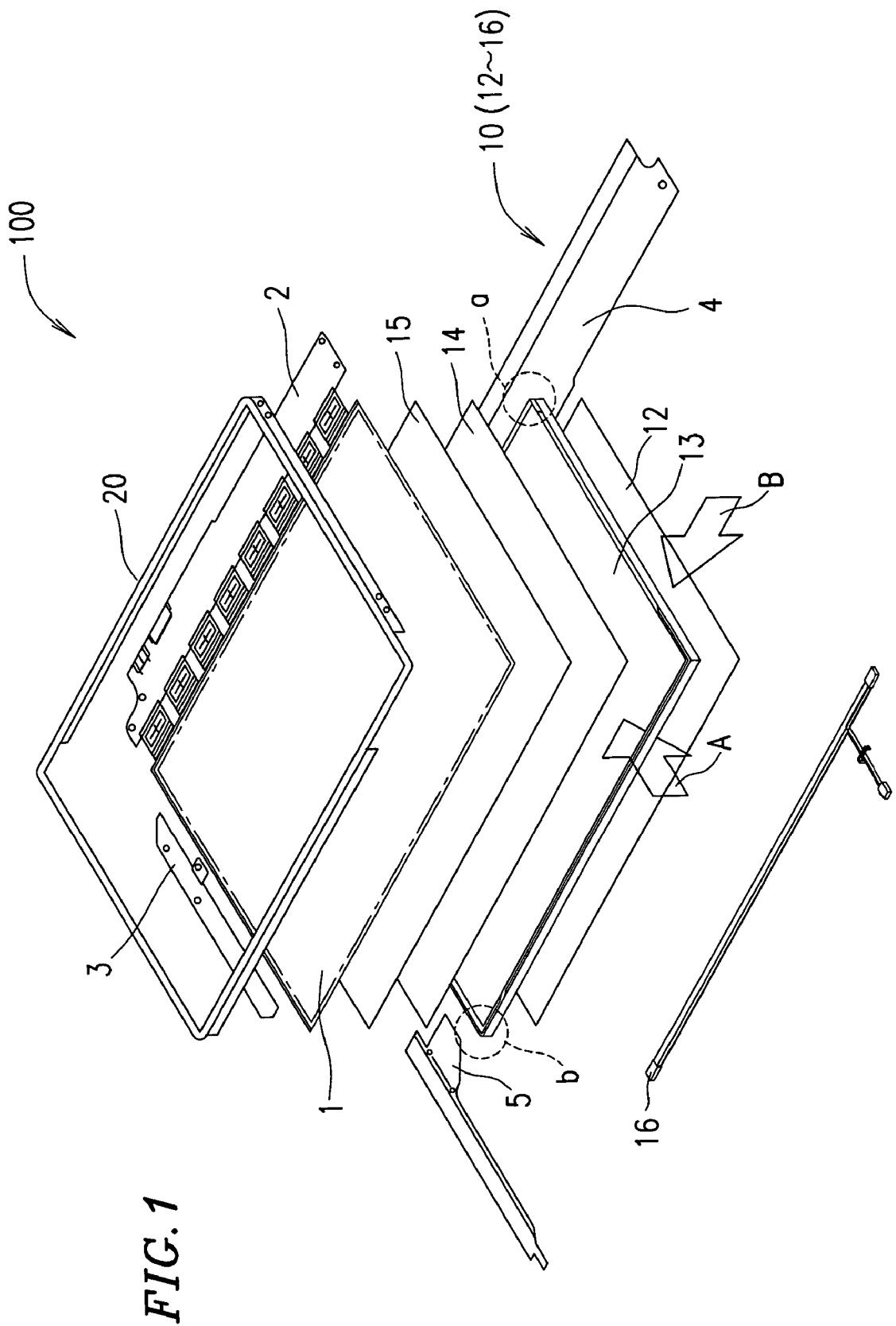
FIG. 1 is an exploded perspective view of a liquid crystal display apparatus comprising a backlight unit according to Embodiment 1 of the present invention, showing a structure of major parts thereof.
Figure 2:
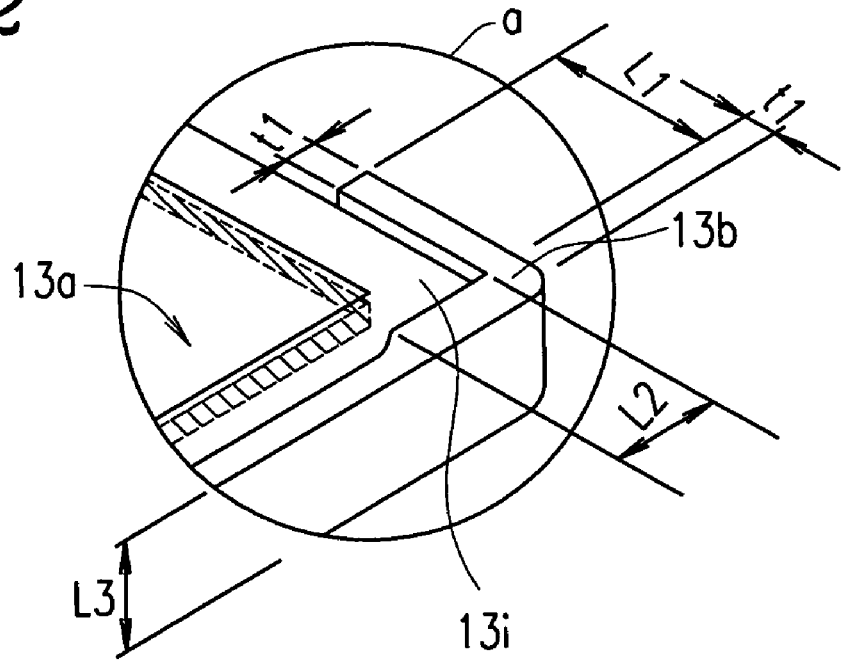
FIG. 2 is a partial enlarged perspective view of a light guide plate contained in the backlight unit of FIG. 1, showing a structure of a portion a encircled by a dashed line in FIG. 1.
Figure 3:
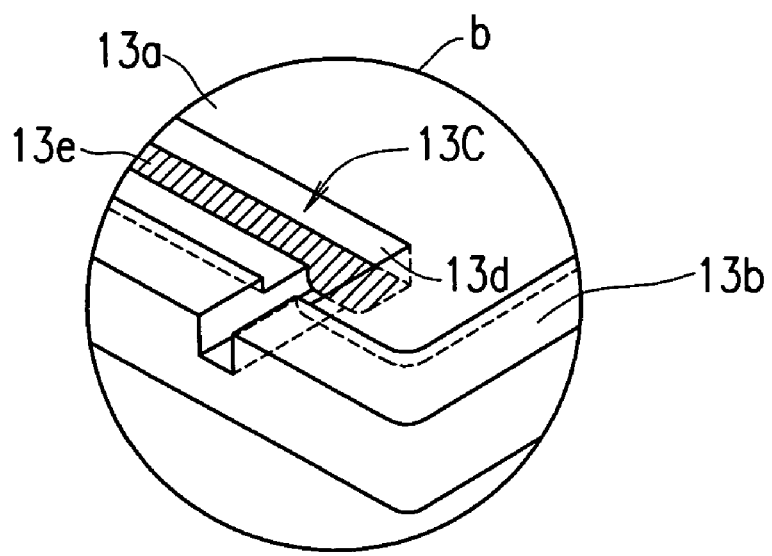
FIG. 3 is a partial enlarged perspective view of the light guide plate contained in the backlight unit of FIG. 1, showing a structure of a portion b encircled by a dashed line in FIG. 1.
Figure 4:
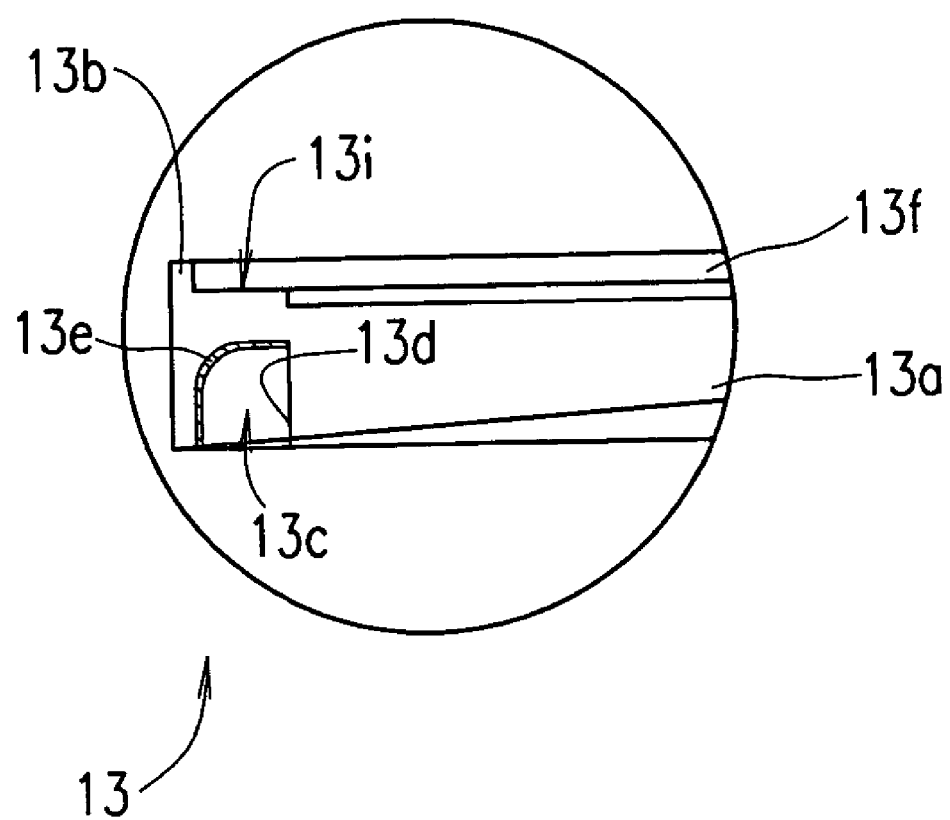
FIG. 4 is a partial enlarged cross-sectional view of the light guide plate of FIG. 1 taken along a direction indicated by arrow A of FIG. 1, as viewed in a direction indicated by arrow B.

FIG. 1 is an exploded perspective view of a liquid crystal display apparatus 100 comprising a backlight unit according to Embodiment 1 of the present invention, showing a structure of major parts thereof. FIG. 2 is a partial enlarged perspective view of a light guide plate 13 contained in the backlight unit, showing a structure of a portion a encircled by a dashed line in FIG. 1. FIG. 3 is a partial enlarged perspective view of the light guide plate 13, showing a structure of a portion b encircled by a dashed line in FIG. 1. FIG. 4 is a partial enlarged cross-sectional view of the light guide plate 13 taken along a direction indicated by arrow A of FIG. 1, as viewed in a direction indicated by arrow B.

Referring to FIG. 1, the liquid crystal display apparatus 100 comprises a liquid crystal panel 1 and a backlight unit 10 provided on the rear side of the liquid crystal panel 1 for illuminating the liquid crystal panel 1.

The backlight unit 10 comprises the light guide plate 13 containing a light-transmissive material, such as an acrylic resin or the like. The liquid crystal panel 1 and the light guide plate 13 are in the shape of a rectangle prism having eight corners at the peripheral portion.

The light guide plate 13 houses other members of the backlight unit 10 and serves as a frame for mounting the liquid crystal panel 1. A rib 13b for reinforcing the light guide plate 13 is provided at a periphery of a wedge-shaped portion 13a hatched in FIG. 2. The rib 13b contains the same light-transmissive material as that which is contained in the wedge-shaped portion 13a. When the liquid crystal panel 1 is mounted on the backlight unit 10, a panel receiving portion 13i provided in a region surrounded by the rib 13b functions to receive the liquid crystal panel 1.

In the backlight unit 10, the rib 13b is provided at the periphery of the light guide plate 13 in such a manner that a portion of the periphery of the light guide plate 13 corresponding to a tip of the wedge-shaped portion 13a is cut off. The rib 13b comprises a protruding portion provided at two corners of the light guide plate 13 corresponding to the tip portion of the wedge-shaped portion 13a and in the vicinity thereof, and a less-protruding portion provided at the periphery of the wedge-shaped portion 13a except the protruding portion.

The size of a liquid crystal display apparatus applied to the backlight unit 10 ranges from a small size (e.g., 1.5 inches) to a large size (e.g., 15 inches). The backlight unit 10 may be manufactured by molding or cutting. Considering the dimensional stability, molding is more preferable.

In a liquid crystal display apparatus ranging from 1.5 inches to 15 inches, the dimensions t1, L1 and L2 of the rib 13b shown in FIG. 2 are 0.5 mm$\leq$t1$\leq$20 mm (the best mode size of 15-inch panels is about 1.5 mm), 0.5 mm$\leq$L1 (the best mode size of 15-inch panels is about 10 mm), and 0.5 mm$\leq$L2 (the best mode size of 15-inch panels is about 10 mm). The dimension L3 of the rib 13b varies depending on the luminance, the configuration of optical sheets, the cost, and the user's demand, though L3 is typically about 5 to 7 mm for 15-inch panels.

Note that the dimension t1 is a width of the rib 13b; the dimension L1 is a length of the protruding portion of the rib 13b parallel to the tip portion of the wedge-shaped portion 13a; the dimension L2 is a length of the protruding portion of the rib 13b perpendicular to the tip portion of the wedge-shaped portion 13a; and the dimension L3 is a height of the less-protruding portion of the rib 13b.

The light guide plate 13 also comprises the panel receiving portion 13i which is a region surrounded by the rib 13b. The panel receiving portion 13i receives optical sheets 14 and 15 in this order from the bottom. A reflection sheet 12 is attached to the rear side of the light guide plate 13.

The optical sheets 14 and 15 are provided so as to made uniform the light which is emitted from the front (broad) side of the light guide plate 13 (emitting portion) to illuminate the liquid crystal panel 1. The reflection sheet 12 is provided so as to reflect light, which is emitted from the rear (broad) side of the light guide plate 13, and allows the light to travel toward the front side of the light guide plate 13.

Figure 11:
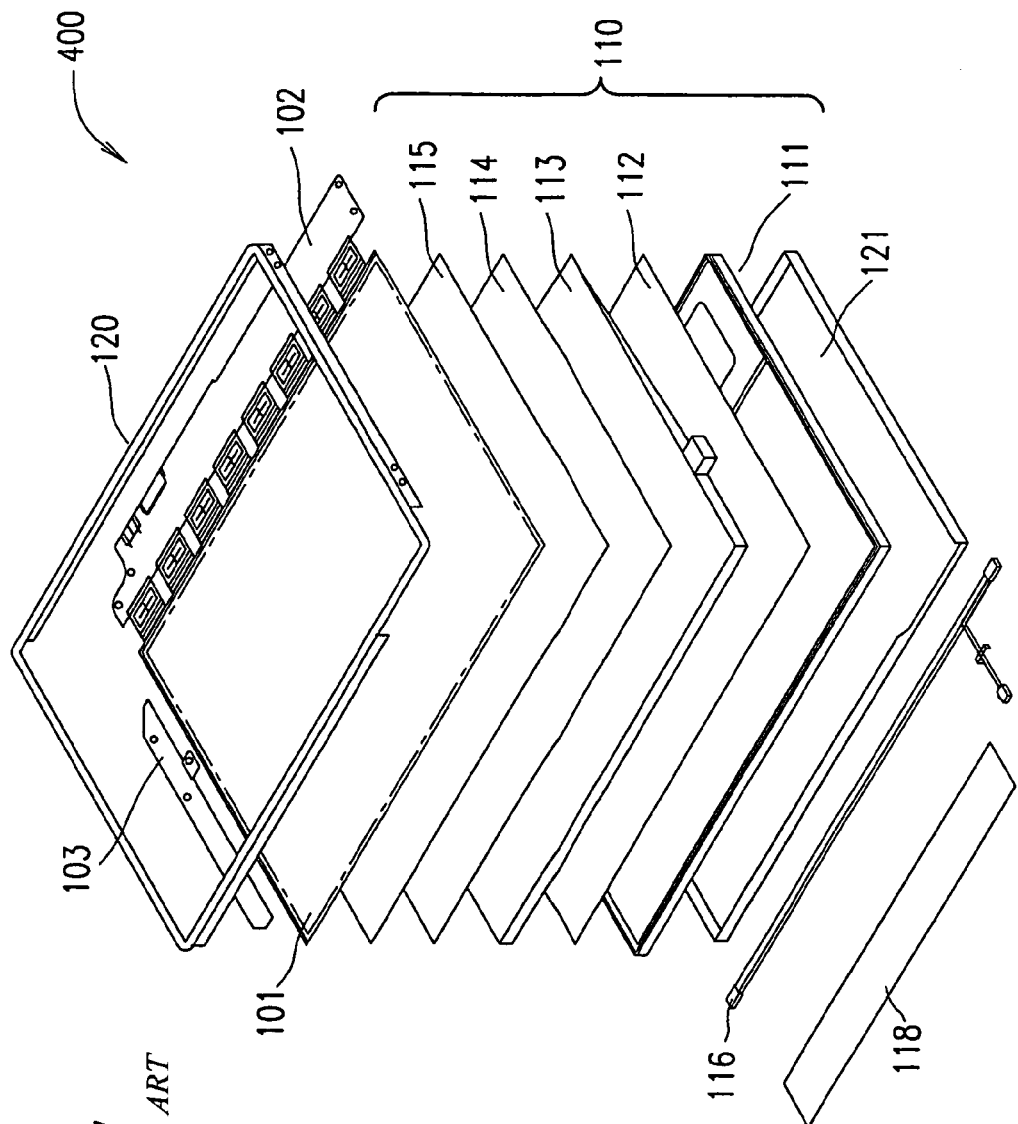
FIG. 11 is an exploded perspective view of another conventional liquid crystal display apparatus, showing the configuration of the major parts thereof.
Figure 12:
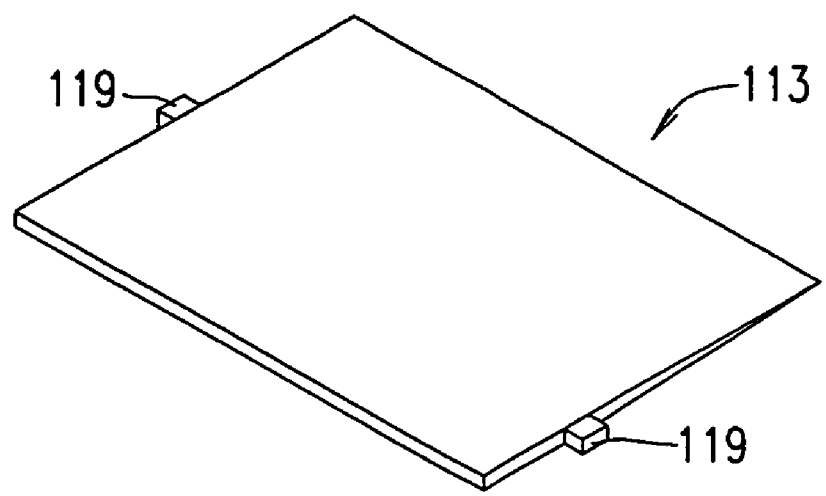
FIG. 12 is a perspective view of a conventional guide plate, showing the structure of the major parts thereof.

Note that a metal reflection plate may be provided instead of the reflection sheet 12 to serve as the back bezel 121 of FIG. 11. In this case, the strength of a liquid crystal display apparatus can be made more reliable.

As shown in FIG. 3, the light guide plate 13 is provided with a groove 13c for mounting a lamp along an end portion of the wedge-shaped portion 13a. A light source (lamp) 16 comprising an LED, a fluorescent tube, or the like is inserted into the groove 13c from the rear of the light guide plate 13. In the case of the backlight unit 10 of FIG. 1, the light source 16 is a linear light source having the shape of a line. The light source 16 is not limited to a linear light source.

A side 13d of the groove 13c is an incident portion (a side of the light guide plate 13), through which light emitted from the light source 16 enters. The incident light travels through the wedge-shaped portion 13a of the light guide plate 13 and outgoes through the front (broad) side (emitting portion) of the light guide plate 13. The two broad sides of the wedge-shaped portion 13a are larger than the side 13d. The front side (emitting portion) of the light guide plate 13 is in the shape of a rectangle.

As shown in hatched portions in FIG. 3 and FIG. 4, an inner side of the groove 13c except the side 13d is provided with a reflective thin film 13e for reflecting light from the lamp 16 toward the side 13d of the light guide plate 13 so as to effectively utilize the light. The reflective thin film 13e is formed by attaching, coating, depositing, or the like. The reflective thin film 13e is made of the same material as that which is used in a lamp cover, a reflector, or the like and has a conventional reflection capability.

Circuit boards 2 and 3 each comprising a peripheral drive circuit are provided around the liquid crystal panel 1. The liquid crystal panel 1 is mounted on the backlight unit 10. The periphery of the liquid crystal panel 1 is fixed by the rib 13b. The circuit boards 2 and 3 are folded onto the rear side of the backlight unit 10. Board covers 4 and 5 are provided so as to insulate and protect the circuit boards 2 and 3. In addition, a front bezel 20 is attached to the front side of the liquid crystal panel 1.

The liquid crystal display apparatus 100 is assembled as follows.

The light source (lamp) 16 comprising an LED, a fluorescent tube, or the like is inserted into the groove 13c from the rear side of the light guide plate 13. The reflective thin film 13e is provided on inner sides of the groove 13c.

Next, the reflection sheet 12 is attached to the rear side of the light guide plate 13. Next, the optical sheets 14 and 15 are housed in a hollow portion 13f surrounded by the rib 13b of the light guide plate 13 in this order from the bottom. Thus, the assembly of the backlight unit 10 is completed.

Next, the liquid crystal panel 1 is mounted onto the backlight unit 10 with at least the four corners of the liquid crystal panel 1 being fixed by the rib 13*b*. The circuit boards 2 and 3 are folded onto the rear side of the backlight unit 10. The board covers 4 and 5 are attached to the backlight unit 10, respectively. A front bezel 20 is attached from above to the assembly (liquid crystal panel 1) so far obtained. Thus, the assembly of the liquid crystal display apparatus 100 is completed.

In Embodiment 1, the light guide plate 13 functions to house other members, thereby making it possible to eliminate frames which are conventionally used. In addition, by incorporating members into the light guide plate 13 given a high rigidity by the rib 13*b*, the ease of assembly of a backlight unit can be improved. Therefore, a manufacturing time can be largely reduced, leading to a lower-cost backlight unit and liquid crystal display apparatus.

Furthermore, since the light guide plate 13 functions to house other members, it is possible to eliminate frames which determine the outer size and thickness of a conventional liquid crystal display apparatus. The light guide plate 13 can be smaller and thinner than the conventional frame 111 of FIGS. 10 and 11. Therefore, it is possible to obtain a thinner liquid crystal display apparatus having a narrower-picture-frame.

Furthermore, the light guide plate 13 is provided with the groove 13*c* into which a lamp is inserted. The reflective thin film 13*e* is provided on the inner side of the groove 13*c* except for the side 13*d* (incident portion). Therefore, a conventional lamp cover can be eliminated, thereby making it possible to reduce the number of steps for assembling a backlight unit and a liquid crystal display apparatus, and therefore, reduce the manufacturing cost.

Figure 13:
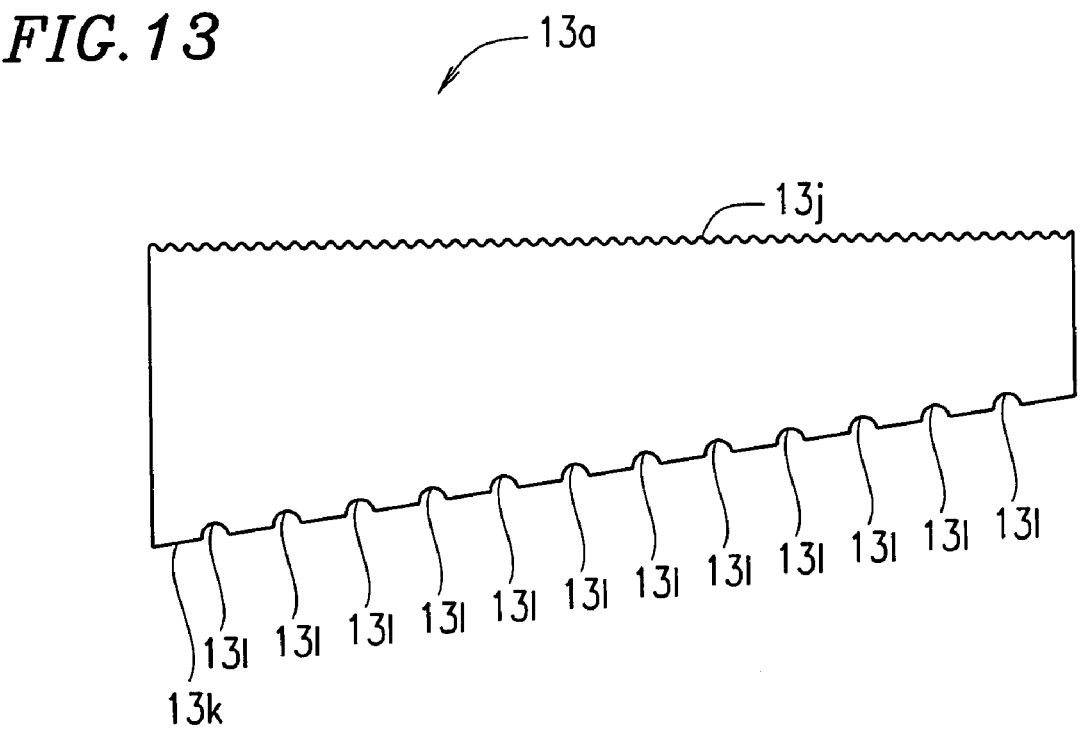
FIG. 13 is a side view of the wedge-like portion of a light guide plate contained in the backlight unit of Embodiment 1 of the present invention.

FIG. 13 is a side view of the wedge-like portion 13*a* of the light guide plate 13 contained in the backlight unit 10 of Embodiment 1 of the present invention.

Referring to FIG. 13, minute pits and projections are provided on a front broad side 13J (light emitting side) of the wedge-like portion 13*a* by printing, graining, or the like. A plurality of grooves 131 extending in a direction perpendicular to a light traveling direction (the direction indicated by arrow A in FIG. 1) are provided on a rear broad side 13*k* of the wedge-like portion 13*a*. With these features, light entering through the incident portion 13*d* is allowed to travel toward the light emitting portion 13*j*, and light illuminating the liquid crystal panel 1 can be made uniform. Therefore, the optical sheets 14 and 15 can be eliminated, thereby further reducing the number of steps for assembly, the number of members, and the manufacturing cost. Furthermore, with this technique, the thickness of a liquid crystal display apparatus can be further reduced.

Embodiment 2

Figure 5:
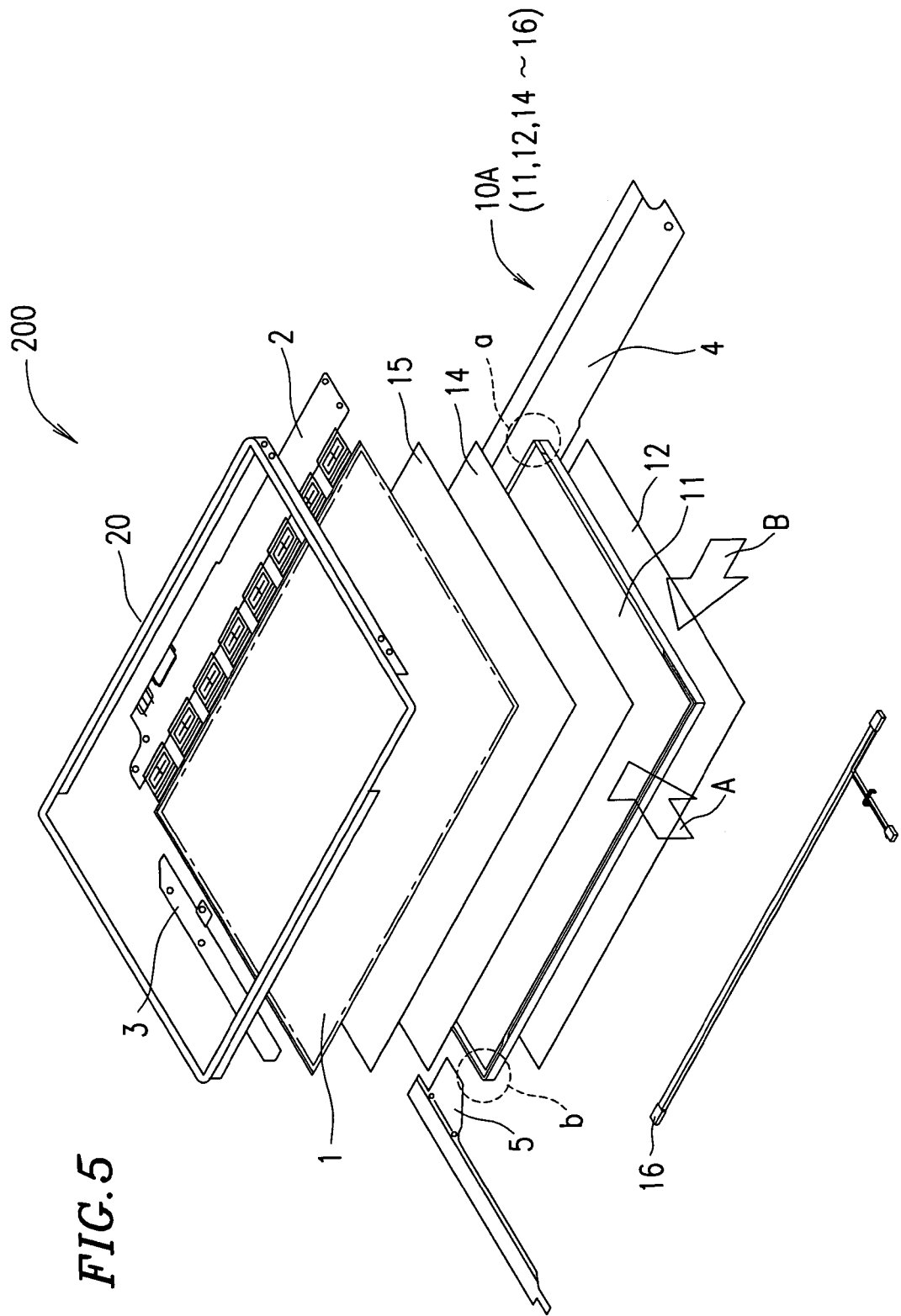
FIG. 5 is an exploded perspective view of a liquid crystal display apparatus comprising a backlight unit according to Embodiment 2 of the present invention, showing a structure of major parts thereof.
Figure 6:
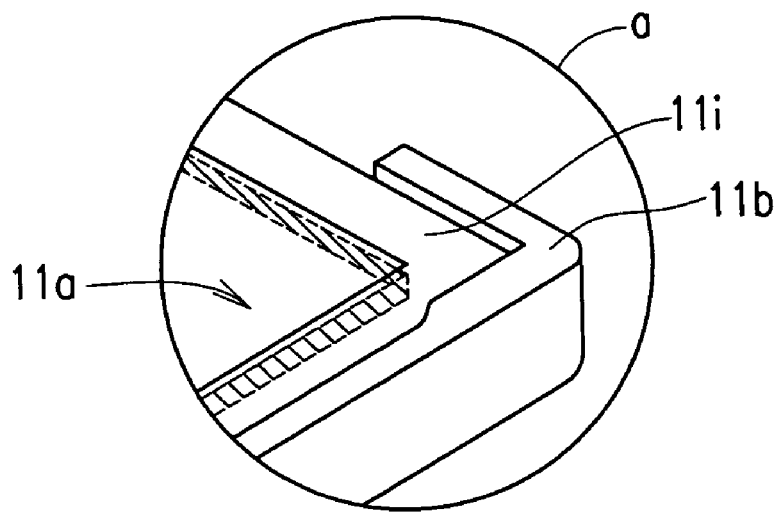
FIG. 6 is a partial enlarged perspective view of a frame contained in the backlight unit of FIG. 5, showing a structure of a portion a encircled by a dashed line in FIG. 5.
Figure 7:
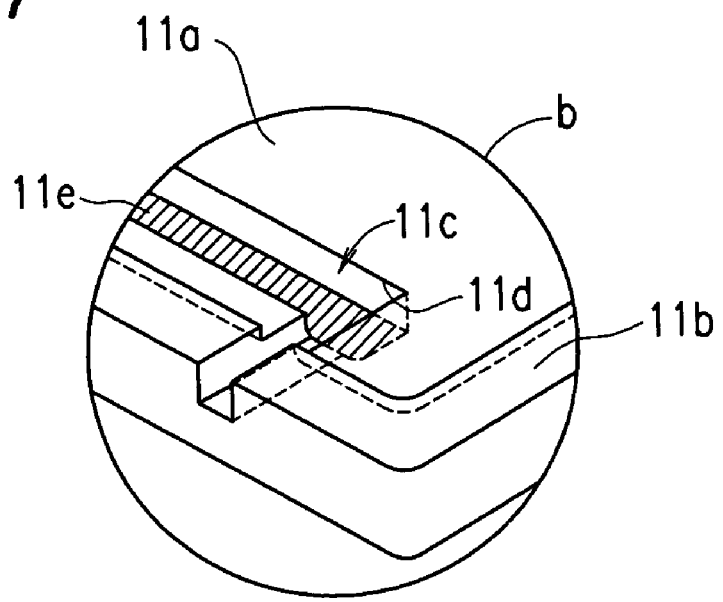
FIG. 7 is a partial enlarged perspective view of the frame contained in the backlight unit of FIG. 5, showing a structure of a portion b encircled by a dashed line in FIG. 5.
Figure 8:
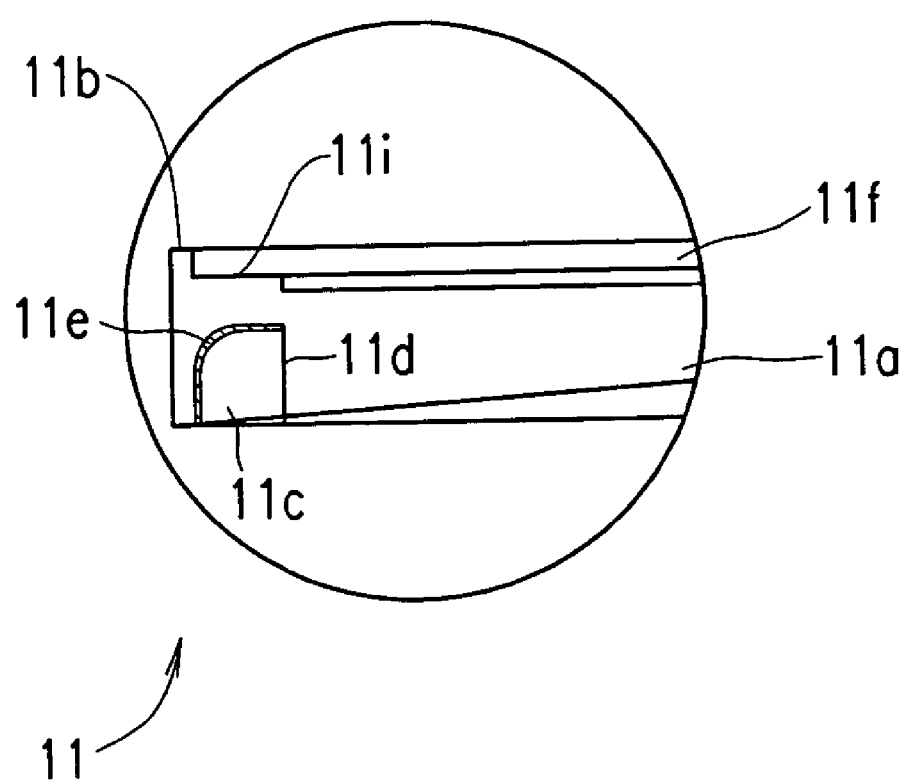
FIG. 8 is a partial enlarged cross-sectional view of the frame of FIG. 5 taken along a direction indicated by arrow A of FIG. 5, as viewed in a direction indicated by arrow B.

FIG. 5 is an exploded perspective view of a liquid crystal display apparatus 200 comprising a backlight unit according to Embodiment 2 of the present invention, showing a structure of major parts thereof. FIG. 6 is a partial enlarged perspective view of a frame 11 contained in the backlight unit, showing a structure of a portion a encircled by a dashed line in FIG. 5. FIG. 7 is a partial enlarged perspective view of the frame 11, showing a structure of a portion b encircled by a dashed line in FIG. 5. FIG. 8 is a partial enlarged cross-sectional view of the frame 11 taken along a direction indicated by arrow A of FIG. 5, as viewed in a direction indicated by arrow B.

Referring to FIG. 5, the liquid crystal display apparatus 200 comprises a liquid crystal panel 1 and a backlight unit 10A provided on the rear side of the liquid crystal panel 1 for illuminating the liquid crystal panel 1.

The backlight unit 10A comprises the frame 11 for housing other members of the backlight unit 10A and mounting the liquid crystal panel 1.

The frame 11 contains a light-transmissive material having a high transmittance as used for a light guide plate. As shown in FIG. 6, a rib 11*b* for reinforcing the frame 11 is provided at a periphery of the frame 11. When the liquid crystal panel 1 is mounted on the backlight unit 10A, a panel receiving portion 11*i* surrounded by the rib 11*b* functions to receive the liquid crystal panel 1.

A wedge-like portion 11*a* hatched in FIG. 6 is a buried portion in which a light-transmissive material is buried and serves as a light guide plate. The frame 11 comprises the panel receiving portion 11*i* which is a region surrounded by the rib 11*b*. The panel receiving portion 11*i* receives optical sheets 14 and 15 in this order from the bottom. A reflection sheet 12 is attached to the rear side of the frame 11.

The optical sheets 14 and 15 are provided so as to make uniform the light which is emitted from the front side of the frame 11 to illuminate the liquid crystal panel 1. The reflection sheet 12 is provided so as to reflect light, which is emitted from the rear side of the frame 11, and allows the light to travel toward the front side of the frame 11.

Note that a metal reflection plate may be provided instead of the reflection sheet 12 to serve as the back bezel 121 of FIG. 11. In this case, the strength of a liquid crystal display apparatus can be made more reliable.

As shown in FIG. 7, the frame 11 is provided with a groove 11*c* for mounting a lamp along an end portion of the wedge-shaped portion 11*a*. A light source (lamp) 16 comprising an LED, a fluorescent tube, or the like is inserted into the groove 11*e* from the rear of the frame 11.

Also in the case of the backlight unit 10A of FIG. 5, the light source 16 is a linear light source having the shape of a line. The light source 16 is not limited to a linear light source.

A side 11*d* of the groove 11*c* is an incident portion of the wedge-like portion 11*a*, through which light emitted from the light source 16 enters. The incident light travels through the wedge-shaped portion 11*a* and exits through the front (broad) side (emitting portion) of the wedge-shaped portion 11*a*. The two broad sides of the wedge-shaped portion 11*a* are larger than the side 11*d*. The front side (including the emitting portion) of the frame 11 is in the shape of a rectangle.

As shown in hatched portions in FIGS. 7 and 8, an inner side of the groove 11*c* except the side 11*d* is provided with a reflective thin film 11*e* for reflecting light from the lamp 16 toward the frame 11 so as to effectively utilize the light. The reflective thin film 11*e* is formed by attaching, coating, depositing, or the like. The reflective thin film 11*e* is made of the same material as that which is used in a lamp cover, a reflector, or the like and has a conventional reflection capability.

Circuit boards 2 and 3 each comprising a peripheral drive circuit are provided around the liquid crystal panel 1. The liquid crystal panel 1 is mounted on the backlight unit 10A. The periphery of the liquid crystal panel 1 is fixed by the rib 11*b*. The circuit boards 2 and 3 are folded onto the rear side of the backlight unit 10A. Board covers 4 and 5 are provided so as to insulate and protect the circuit boards 2 and 3. In addition, a front bezel 20 is attached to the front side of the liquid crystal panel 1.

The liquid crystal display apparatus 200 is assembled as follows.

The light source (lamp) 16 comprising an LED, a fluorescent tube, or the like is inserted into the groove 11*c* from the rear side of the frame 11. The reflective thin film 11e is provided on inner sides of the groove 11c.

Next, the reflection sheet 12 is attached to the rear side of the frame 11. Next, the optical sheets 14 and 15 are housed in a portion surrounded by the rib 11b of the frame 11 in this order from the bottom. Thus, the assembly of the backlight unit 10A is completed.

Next, the liquid crystal panel 1 is fixed onto the backlight unit 10A with the rib 11b. The circuit boards 2 and 3 are folded onto the rear side of the backlight unit 10A. The board covers 4 and 5 are attached to the backlight unit 10A, respectively. A front bezel 20 is attached from above to the assembly (liquid crystal panel 1) so far obtained. Thus, the assembly of the liquid crystal display apparatus 200 is completed.

In Embodiment 2, the frame 11 functions as a light guide plate, thereby making it possible to eliminate a light guide which is conventionally used. In addition, by incorporating members into the frame 11 obtained by burying a light-transmissive material into a buried portion, the ease of assembly of a backlight unit can be improved. Therefore, the manufacturing time, the number of steps for assembly, and the number of members can be largely reduced, leading to a reduction in the manufacturing cost.

Figure 10:
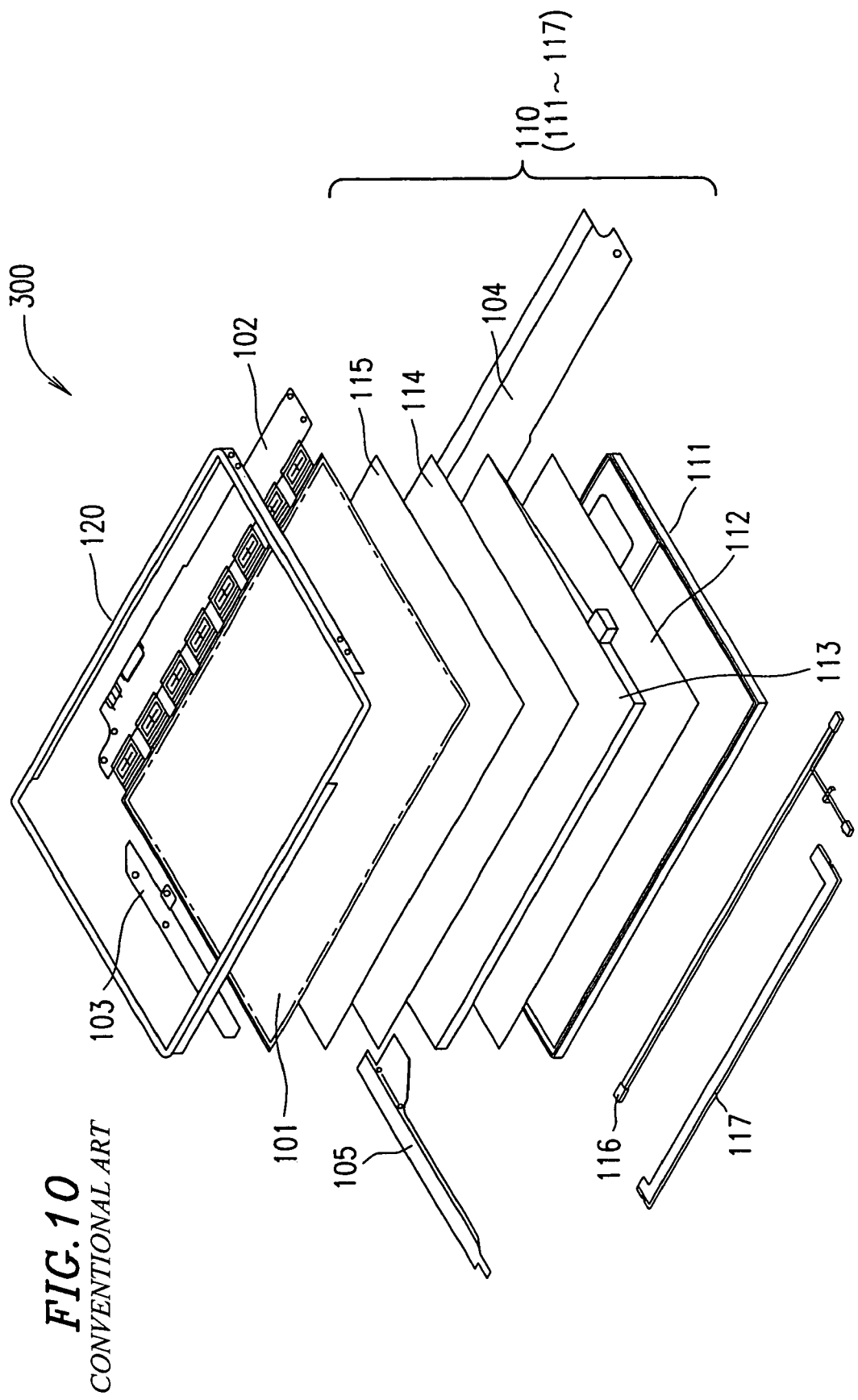
FIG. 10 is an exploded perspective view of a conventional liquid crystal display apparatus, showing the configuration of the major parts thereof.

Furthermore, since the frame 11 functions as a light guide plate, the frame 11 can be smaller and thinner than the conventional frame 111 of FIGS. 10 and 11. Therefore, it is possible to obtain a thinner liquid crystal display apparatus having a narrower-picture-frame.

Furthermore, the frame 11 is provided with the groove 11c into which a lamp is inserted. The reflective thin film 11e is provided on the inner side of the groove 11c except for the side 11d (incident portion). Therefore, a conventional lamp cover can be eliminated, thereby making it possible to produce a lower-cost backlight unit and liquid crystal display apparatus.

Figure 14:
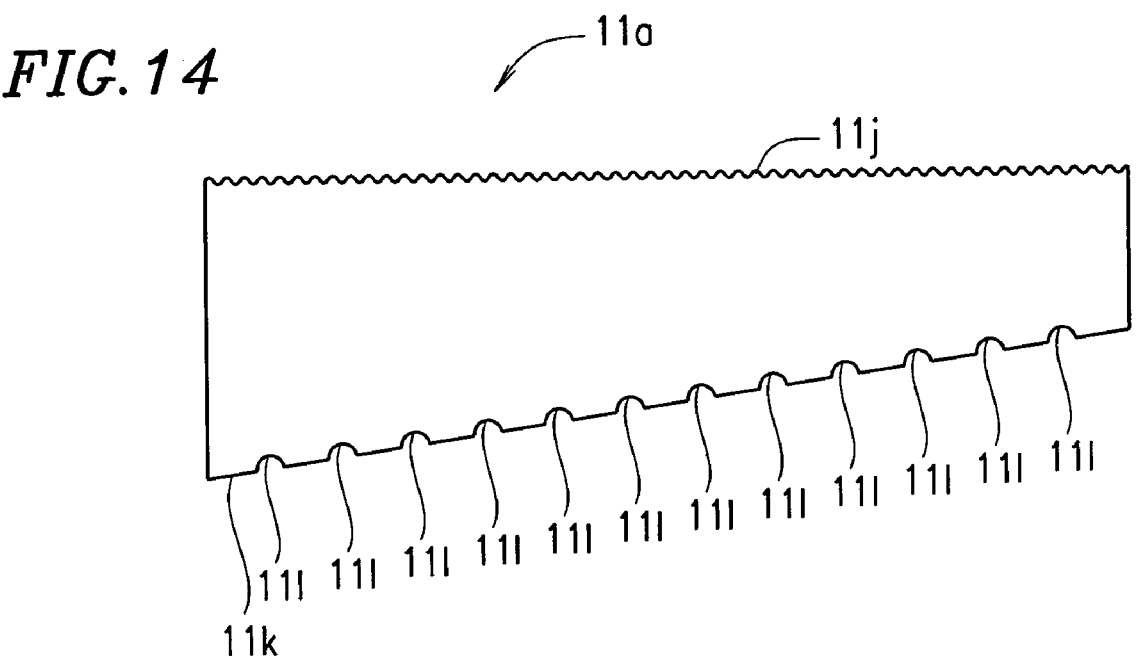
FIG. 14 is a side view of the wedge-like portion of a frame contained in the backlight unit of Embodiment 2 of the present invention.

FIG. 14 is a side view of the wedge-like portion 11a of the frame 11 contained in the backlight unit 10A of Embodiment 2 of the present invention.

Referring to FIG. 14, minute pits and projections are provided on a front broad side 11j (light emitting side) of the wedge-like portion 11a by printing, graining, or the like. A plurality of grooves 111 extending in a direction perpendicular to a light traveling direction (the direction indicated by arrow A in FIG. 5) is provided on a rear broad side 11k of the wedge-like portion 11a.

With these features, light entering through an incident portion is allowed to travel toward the light emitting portion 11j, and light illuminating the liquid crystal panel 1 can be made uniform. Therefore, the optical sheets 14 and 15 can be eliminated, thereby further reducing the number of steps for assembly, the number of members, and the manufacturing cost.

The width, height, and lengths of the rib 11b of the frame 11 in the backlight unit 10A are the same as the width, height, and lengths (see t1, L1 to L3 in FIG. 2) of the rib 13b of the light guide plate 13 in the backlight unit 10 of Embodiment 1.

As described above, Japanese Laid-Open Publication No. 9-282919 discloses a backlight unit in which a light guide plate and a frame are integrally welded together with spot-like welding portions to avoid close attachment of the light guide plate and the frame, which is provided to solve the problem that if the light guide plate and the frame are attached together, light is reflected on the contact portion of the light guide plate and the frame so that the contact portion is brighter than other portions and therefore luminance irregularity occurs However, in this conventional technique, a plurality of members (a light guide plate and a frame) are integrated. Therefore, this conventional technique is different from the present invention in which one member can serve as both a light guide plate and a frame. In the present invention, there is only one member molded of a light-transmissive material. The present invention does not require a conventional technique for integrating a plurality of members or materials. Therefore, substantially no luminance irregularity caused by the interface of materials occurs.

As described above, Japanese Laid-Open Publication No. 2001-75490 discloses a backlight unit in which a diffusion plate and a panel holder are integrated or a diffusion plate, a frame, and a lamp holder are integrated. However, this conventional technique is directed to a backlight provided right under a liquid crystal panel (direct backlight system), since a diffusion plate is employed. Therefore, this conventional technique is different from the present invention in which a light guide plate is employed and a backlight is provided at an edge of a liquid crystal panel (edge light system).

As described above, Japanese Laid-Open Publication No. 2002-109931 discloses a backlight unit in which a dot pattern is printed on the rear side (reflection side) of a light guide plate followed by deposition of a metal reflection film, whereby the backlight unit can have a small thickness, and minute pits and projections for diffusing light are created on the front side (light emitting side) of the light guide plate.

In the present invention, a dot pattern of minute pits and projections is provided on the light emitting side (broad side) of a frame or a light guide plate by printing, graining, or the like, and a plurality of grooves extending in a direction perpendicular to a light traveling direction are provided on the rear side thereof. Therefore, light from the incident portion is allowed to travel toward the light emitting portion, and light for illuminating a liquid crystal panel can be made uniform. Thus, the present invention can provide a technique for reducing the thickness of a light guide plate, a technique for providing a light guide plate with a lens effect (high luminance technique), and the like.

In Embodiments 1 and 2, a light source is provided at one side of a light guide plate or a buried portion. However, a light source may be provided at two or more sides of a light guide plate or a buried portion to create incident light. An example of the light source includes a light source in which light emitting diodes having three primary colors (e.g., a set of red, blue and green, etc.) are arranged on a line.

In Embodiment 1, the rib 13b containing the same light-transmissive material as that of the wedge-shaped portion 13a is provided at the periphery of the wedge-shaped portion 13a (the four corners of the light guide plate 13) as shown in FIG. 2. However, the present invention is not limited to such an embodiment. The rib 13b may be divided into a rib 13B1 and 13B2 while removing a corner rib portion, as shown in FIG. 9A.

Figure 9A:
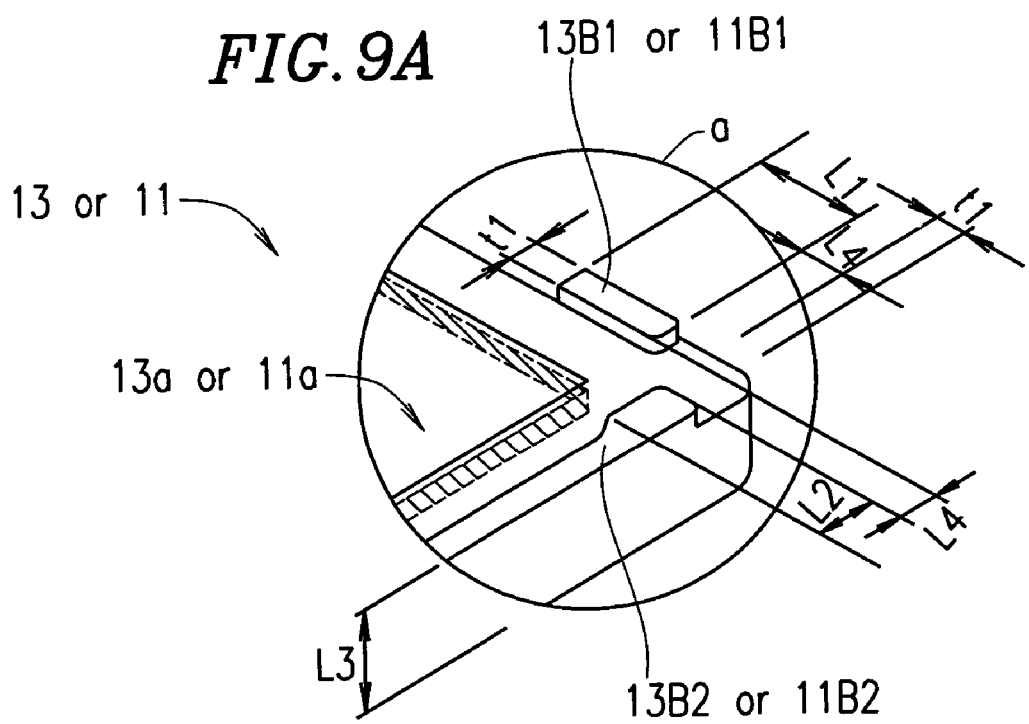
FIG. 9A is a perspective view showing a structure of another rib in a backlight according to the present invention.
Figure 9B:
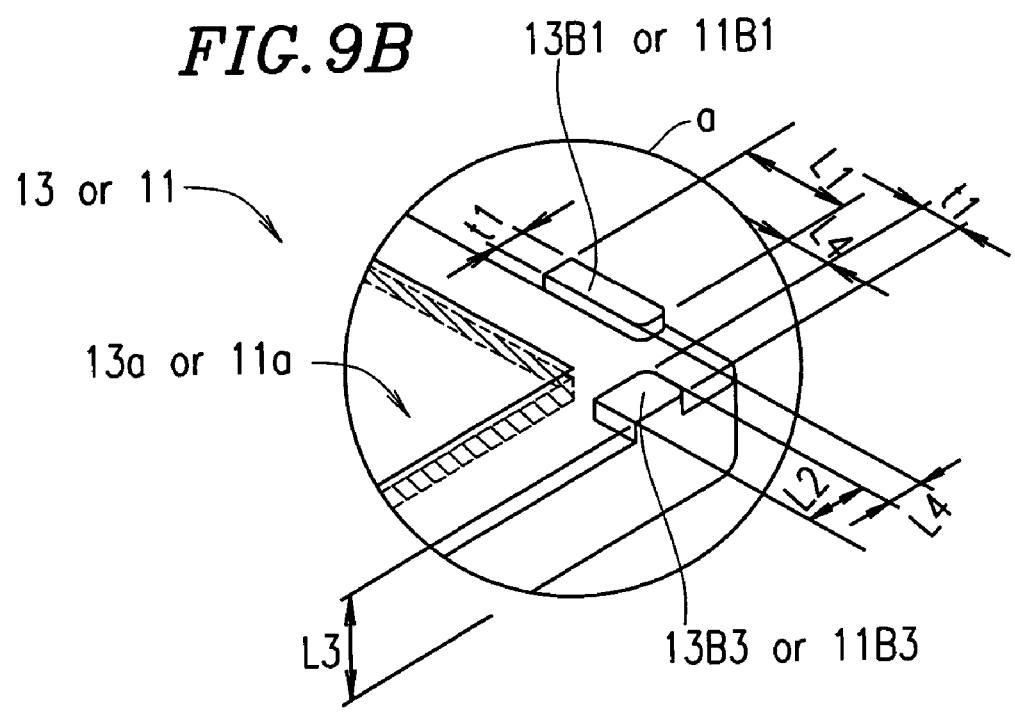
FIG. 9B is a perspective view showing a structure of still another rib in a backlight according to the present invention.

As shown in FIG. 9B, another example of a rib in the vicinity of a corner portion lacking a corner portion (ribs 13B1 and 13B3).

The rib 13B2 (FIG. 9A) comprises a protruding portion provided in the vicinity of a corner and having a prescribed length and a less-protruding portion extending from the protruding portion along the periphery of the wedge-like portion 13a. In contrast, the rib 13B3 (FIG. 9B) comprises a protruding portion provided in the vicinity of a corner and having a prescribed length but not a less-protruding portion. Note that in FIGS. 9A and 9B, the rib 13B1 is a protruding portion.

In FIG. 9A, a dimension t1 is a width of the rib 13B1, 13B2; a dimension L1 is a length of the protruding portion of the rib 13B1 parallel to the tip portion of the wedge-shaped portion 13a; a dimension L2 is a length of the protruding portion of the rib 13B2 perpendicular to the tip portion of the wedge-shaped portion 13a; a dimension L3 is a height of the less-protruding portion of the rib 13B2; and a dimension L4 is a length from the corner portion to the protruding portion of the rib 13B1 or 13B2, in which the rib 13B1 or 13B2 is not provided.

In FIG. 9B, a dimension t1 is a width of the rib 13B1, 13B3; a dimension L1 is a length of the protruding portion of the rib 13B1 parallel to the tip portion of the wedge-shaped portion 13a; a dimension L2 is a length of the protruding portion of the rib 13B3 perpendicular to the tip portion of the wedge-shaped portion 13a; a dimension L3 is a height of the light guide plate 13 excluding the ribs 13B1 and 13B3; and a dimension L4 is a length from the corner portion to the protruding portion of the rib 13B1 or 13B3, in which the rib 13B1 or 13B3 is not provided.

In Embodiment 2, the rib 11b containing the same light-transmissive material as that of the wedge-shaped portion 11a is provided at the periphery of the wedge-shaped portion 11a (the four corners of the frame 11) as shown in FIG. 6. However, the present invention is not limited to such an embodiment. The rib 11b may be divided into a rib 11B1 and 11B2 while removing a corner rib portion, as shown in FIG. 9A.

FIG. 9B shows another example of ribs 11B1 and 11B3 in the vicinity of the corner portion, but lacking a corner portion.

The rib 11B2 (FIG. 9A) comprises a protruding portion provided in the vicinity of a corner and having a prescribed length and a less-protruding portion extending from the protruding portion along the periphery of the wedge-like portion 11a. In contrast, the rib 11B3 (FIG. 9B) comprises a protruding portion provided in the vicinity of a corner and having a prescribed length but not a less-protruding portion. Note that in FIGS. 9A and 9B, the rib 11B1 is a protruding portion.

In FIG. 9A, a dimension t1 is a width of the rib 11B1, 11B2; a dimension L1 is a length of the protruding portion of the rib 11B1 parallel to the tip portion of the wedge-shaped portion 11a; a dimension L2 is a length of the protruding portion of the rib 11B2 perpendicular to the tip portion of the wedge-shaped portion 11a; a dimension L3 is a height of the less-protruding portion of the rib 11B2; and a dimension L4 is a length from the corner portion to the protruding portion of the rib 11B1 or 11B2, in which the rib 11B1 or 11B2 is not provided.

In FIG. 9B, a dimension t1 is a width of the rib 11B1, 11B3; a dimension L is a length of the protruding portion of the rib 11B1 parallel to the tip portion of the wedge-shaped portion 11a; a dimension L2 is a length of the protruding portion of the rib 11B3 perpendicular to the tip portion of the wedge-shaped portion 11a; a dimension L3 is a height of the frame 11 excluding the ribs 11B1 and 11B3; and a dimension L4 is a length from the corner portion to the protruding portion of the rib 11B1 or 11B3, in which the rib 11B1 or 11B3 is not provided.

When the above-described backlight unit is applied to a liquid crystal display apparatus ranging from 1.5 inches to 15 inches, the dimensions t1, L1 and L2 of FIG. 9 are preferably 0.5 mm$\leq$t1$\leq$20 mm (the best mode size of 15-inch panels is about 1.5 mm), 0.5 mm$\leq$L1 (the best mode size of 15-inch panels is about 10 mm), and 0.5 mm$\leq$L2 (the best mode size of 15-inch panels is about 10 mm).

The dimension L3 varies depending on the luminance, the configuration of optical sheets, the cost, and the user's demand, though L3 is preferably about 5 to 7 mm for 15-inch panels. The dimension L4 (where a corner rib is omitted from the four corner portions) is preferably 0.5 mm$\leq$L4$\leq$50 mm.

As described in Embodiments 1 and 2, the present invention can provide an element capable of functioning as both a frame and a light guide plate. This element may be called "light guide plate" as in Embodiment 1 or "frame" as in Embodiment 2.

A single rib or a plurality of ribs may be provided at a periphery of the element.

At least one rib may be provided on at least a portion of the periphery of the element, such as in the vicinity of a corner of the element.

More particularly, each rib may be provided at the entire periphery including the four corners or a portion of the periphery. Alternatively, each rib may be provided both at a corner and in the vicinity of the corner, or only in the vicinity of the corner. The vicinity of the corner refers to any of the vicinities of adjacent corners, the vicinity of opposing corners, and the vicinity of all four corners.

Across-section of the rib is preferably in a taper shape in which the root of the rib is wider than the top. In this case, the optical sheets 14 and 15 and the liquid crystal panel 1 can be more easily housed by rib(s) and a play can be reduced, so that the members can be more properly housed.

Thus, in the field of a backlight for illuminating, for example, a liquid crystal panel from the rear side thereof and a liquid crystal display apparatus comprising the same, the present invention provides a smaller-sized and thinner backlight unit having a narrower-picture-frame which is easy to assemble and excellent for mass production.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A backlight unit, comprising:
   a light source for generating light; and
   an element comprising a rear broad side and a front broad side, the rear broad side having a groove with an incident portion on a first side of the groove through which light generated by the light source enters into the element, and the front broad side having an emitting portion through which the entering light is emitted after traveling through the element,
   wherein a light reflective thin film is provided on the entire inner side of the groove except the first side,
   wherein a rib is provided on at least a portion of a periphery of the element to reinforce the element, and
   a panel receiving portion is provided at a portion of the element surrounded by the rib.

2. A backlight unit according to claim 1, wherein the element is a light guide plate.

3. A backlight unit according to claim 2, wherein:
   the light guide plate is provided with the groove along at least an edge of the rear broad side and the light source is provided in the groove; and light generated by the light source enters through the incident portion of the groove into the light guide plate.

4. A backlight unit according to claim 2, wherein:

a dot pattern of minute pits and projections is provided on the front broad side of the light guide plate; and the rear broad side is opposed to the front broad side, the rear broad side having a plurality of grooves being arranged substantially in parallel to the front broad side.

5. A backlight unit according to claim 1, wherein:

the front broad side is in the shape of a rectangle having four corner portions; and the rib is provided in the vicinity of any of the four corner portions.

6. A backlight unit according to claim 5, wherein:

at least an additional rib is provided on at least a portion of the periphery of the element; and a plurality of ribs including the rib and the additional rib are provided in the vicinity of two adjacent corner portions of the four corner portions, in the vicinity of two opposing corner portions of the four corner portions, or in the vicinity of the four corner portions.

7. A backlight unit according to claim 5, wherein the rib is provided on any of the four corner portions as well as in the vicinity thereof.

8. A backlight unit according to claim 1, wherein:

the element is a frame having a buried portion in which a light-transmissive material is buried.

9. A backlight unit according to claim 8, wherein:

the buried portion is provided with the groove along at least an edge of a rear broad side of the buried portion and the light source is provided in the groove; and light generated by the light source enters through the incident portion of the groove into the buried portion.

10. A backlight unit according to claim 8, wherein:

a dot pattern of minute pits and projections is provided on a front broad side of the buried portion; and the rear broad side of the buried portion is opposed to the front broad side of the buried portion, the rear broad side of the buried portion having a plurality of grooves being arranged substantially in parallel to the front broad side of the buried portion.

11. A liquid crystal display apparatus, comprising:

a liquid crystal panel; and a backlight unit for illuminating the liquid crystal panel, wherein the backlight unit comprises:

a light source for generating light;

an element comprising a rear broad side and a front broad side, the rear broad side having a groove with an incident portion on a first side of the groove through which light generated by the light source enters into the element, and the front broad side having an emitting portion through which the light is emitted after traveling through the element, wherein a light reflective thin film is provided on the entire inner side of the groove except the first side, wherein a rib is provided on at least a portion of a periphery of the element to reinforce the element, and a panel receiving portion is provided at a portion of the element surrounded by the rib.

* * * * *